No. 721,260. PATENTED FEB. 24, 1903.
J. J. WALTER.
VAULT CONSTRUCTION.
APPLICATION FILED MAR. 9, 1901.
NO MODEL.
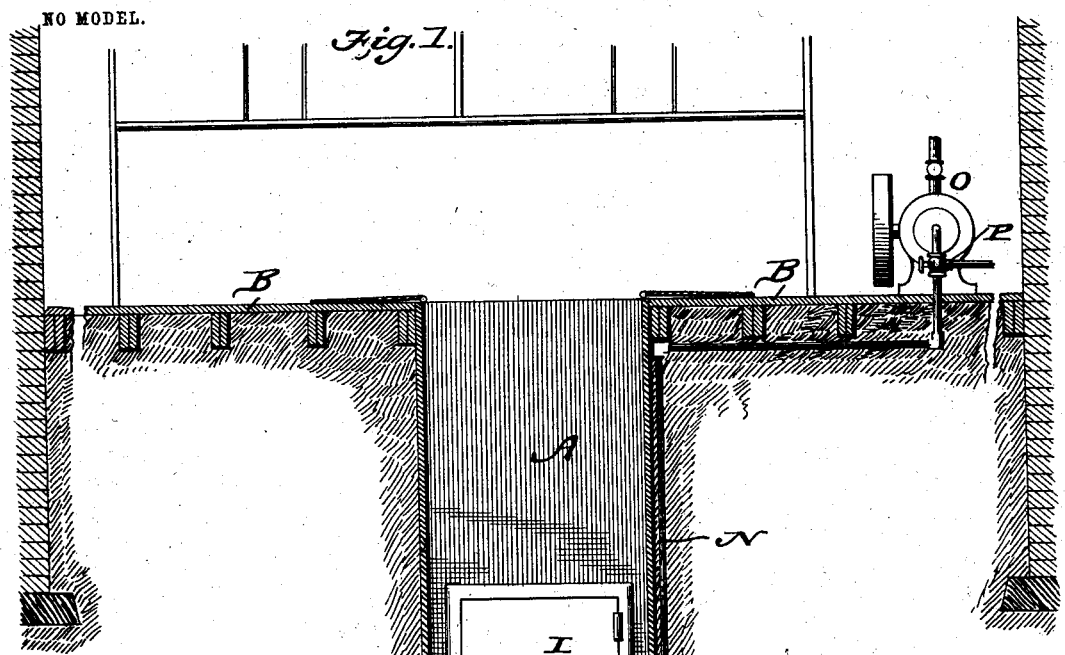
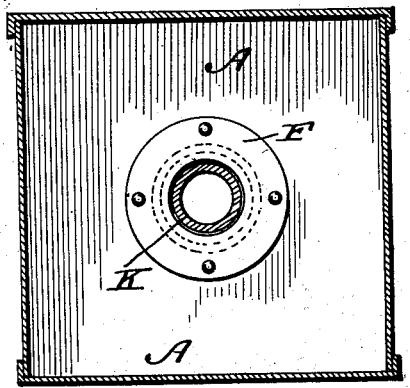
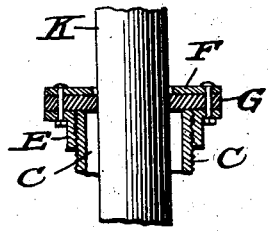
Inventor
Joseph J. Walter.

UNITED STATES PATENT OFFICE.

JOSEPH J. WALTER, OF WAPAKONETA, OHIO.

VAULT CONSTRUCTION.

SPECIFICATION forming part of Letters Patent No. 721,260, dated February 24, 1903.

Application filed March 9, 1901. Serial No. 50,531. (No model.)

*To all whom it may concern:*

Be it known that I, JOSEPH J. WALTER, a citizen of the United States, residing at Wapakoneta, in the county of Auglaize, in the State of Ohio, have invented a new and useful Improvement in Vault Construction, of which the following is a specification.

This invention relates to improvements in vaults for the preservation of valuables; and the object is to provide a simple and improved arrangement of vault which will be proof against fire and burglary, thereby affording better protection to the money and other valuables placed therein for safe keeping.

With the above object in view the invention consists in providing a compartment arranged at a considerable distance beneath the surface of the floor of the bank or other building, a plunger movable in said compartment, a receptacle or safe to contain the valuables elevated and lowered by the movement of said plunger, the receptacle or safe being of a height much smaller than the depth of the compartment, so that when lowered thereinto it will be a considerable distance below the floor of the building, and means connected with the lower end of the compartment for supplying the same with water or other agent under pressure, the capacity of said means being such that in full operation the safe will not be raised in position to be accessible until the end of a predetermined period of time.

The apparatus by which the above object is attained will be fully described hereinafter, particularly pointed out in the claim, and clearly illustrated by the accompanying drawings, in which—

Figure 1 is a longitudinal sectional view of a vault constructed in accordance with my invention, the safe being shown in position and the pumping mechanism being shown in outline. Fig. 2 is a detail section on the line 2 2 of Fig. 1, and Fig. 3 is a detail of construction.

Referring now more particularly to the accompanying drawings, A designates a vertically-arranged compartment or casing having its upper end open and arranged on a level with the floor B of the bank or other building, the remainder of said casing being embedded in the ground. The casing has its bottom wall closed and formed with a centrally-screw-threaded opening to receive the screw-threaded upper end of a vertically-disposed cylinder C, having its lower end closed, as shown. The upper end of said cylinder projects above the bottom wall of the casing and receives a collar E. A collar or ring F is bolted to the collar E, and placed between these two collars is a packing-ring G for the purpose presently to be set forth. Movable vertically in the casing is a platform H, upon which the safe or receptacle I rests, said platform having an annular seat or ring J, in which the upper end of a cylindrical stem K is positioned. This stem is open at its lower end and is provided at said open end with an exterior bearing-collar L and has formed therein above said collar a plurality of perforations M. This stem moves in the cylinder C through the collars E and F and the packing-ring G. Communicating at its lower end with the cylinder C at a point just below the bottom wall of the casing is a pipe N, said pipe extending upwardly at the side of the casing and at its upper end connected with a suitable pump O for supplying water, air, or other agent under pressure to the lower end of the casing. Said pipe is provided near the pump with a valved outlet P.

The platform is normally held in its upward position, with the safe raised to the surface of the floor, by air or water or other agent pumped into the cylinder C, causing the stem to be elevated in said cylinder, thus raising the platform in the casing. When it is desired to lower the safe—as, for instance, at the close of the day's business—the valve in the pipe is opened, which cuts off the pressure from within the stem, permitting the same to descend by the weight of the safe forcing the air or liquid through the outlet-pipe. The casing is of such depth that access to the safe when lowered into the casing will be impossible. The safe is also proof against fire, as the casing is formed of a fireproof material, and is also made water-tight.

When it is desired to gain access to the safe, the pump is set in operation, which forces the air or water into the stem, causing the same to be elevated and carrying with it the platform upon which the safe rests. The capacity of this pump is such that the platform is not entirely raised with the safe until a lapse of considerable time, this being determined by the banker or other person using the vault. Thus, for instance, the capacity of the pump may be so limited that the safe will not be raised for six or eight hours, so that it will be impossible for any one attempting to burglarize the same to effect the raising by operating the pump. The pump would be set in operation by the watchman or other person having charge of the vault at the necessary time in the night to insure the complete elevation of the safe at the opening of the bank in the morning.

Having thus fully described my invention, what I claim as new, and desire to secure by Letters Patent of the United States, is—

In a vault for safes, the combination with a vault positioned beneath a building, a cylindrical pipe extending downward from the center and bottom of said vault, the upper end of said pipe extending into the vault, a cylindrical stem of a length equal to the height of the vault adapted to slide in said pipe, a platform mounted on the stem, and means for lowering the platform to the bottom of the vault.

JOSEPH J. WALTER.

Witnesses:
JOHN BECHDOLT,
CHRISTIAN LANGHORST.